Dec. 24, 1963
G. E. HIRT
3,115,320
EJECTION SEAT CATAPULT
Filed Feb. 3, 1959
3 Sheets-Sheet 1
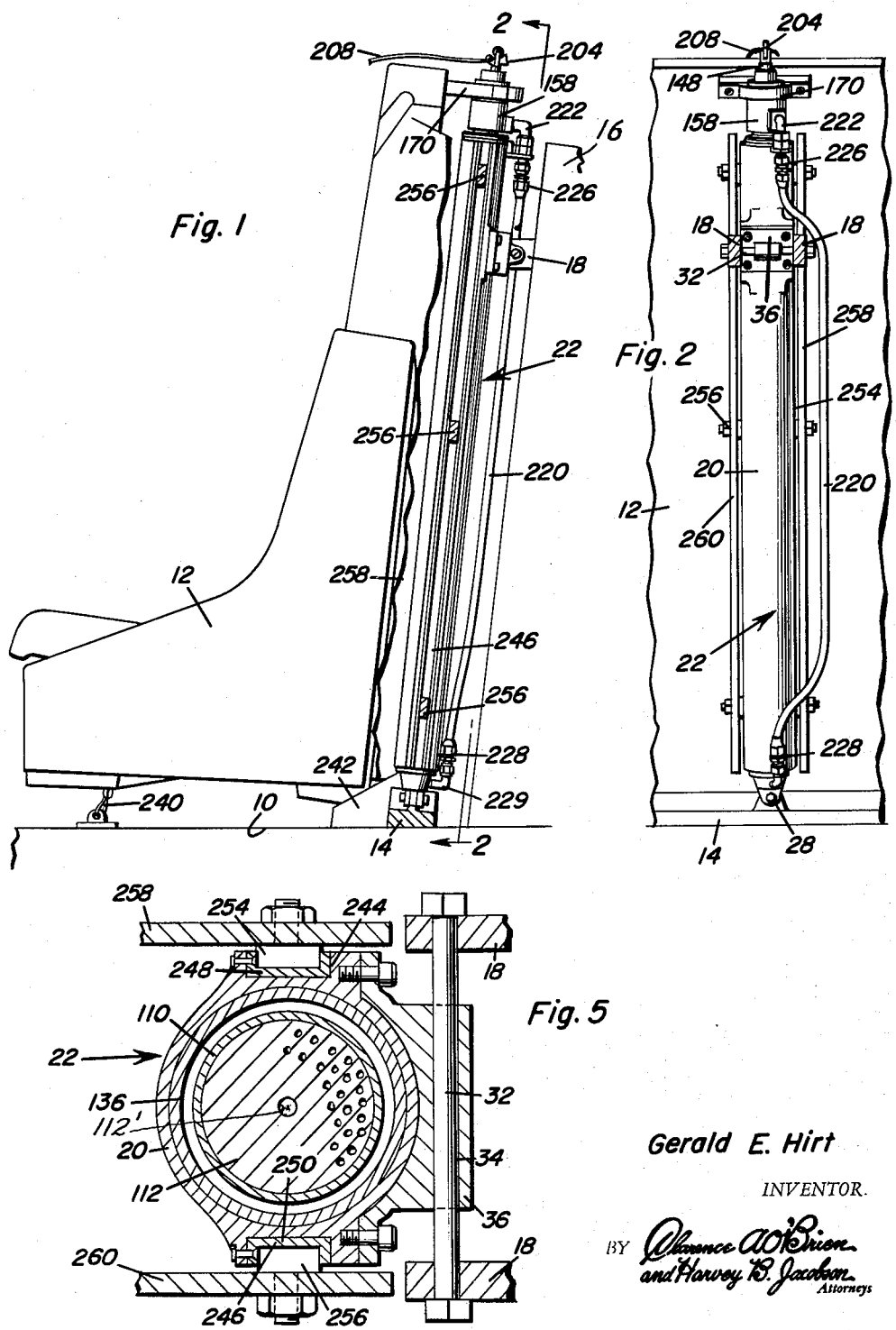
Gerald E. Hirt
INVENTOR.
BY Clarence A. O'Brien
and Harvey B. Jacobson
Attorneys Dec. 24, 1963   G. E. HIRT   3,115,320
EJECTION SEAT CATAPULT
Filed Feb. 3, 1959   3 Sheets-Sheet 2

Gerald E. Hirt
INVENTOR.

BY
Attorneys

Dec. 24, 1963  G. E. HIRT  3,115,320
EJECTION SEAT CATAPULT
Filed Feb. 3, 1959  3 Sheets-Sheet 3

Gerald E. Hirt
INVENTOR.

United States Patent Office 3,115,320
Patented Dec. 24, 1963

1

3,115,320
EJECTION SEAT CATAPULT
Gerald E. Hirt, Mesa, Ariz., assignor, by mesne assignments, to Rocket Power, Inc., a corporation of Arizona
Filed Feb. 3, 1959, Ser. No. 790,923
1 Claim. (Cl. 244—122)

This invention relates to safety apparatus for aircraft and more particularly to an upward ejection rocket catapult for the occupied seat of an aircraft.

Cartridge actuated catapults and rocket catapults are known in the art. The catapult described herein combines the beneficial features of the cartridge and the rocket, integrating them in such a way that an occupied seat in an aircraft is quickly but safely ejected to a sufficient height to clear the empennage of the airplane or other aircraft and yet, maintain the acceleration within human tolerance.

An object of this invention is to provide a combined cartridge ejected and thereafter a rocket propelled catapult for an ejected part of an aircraft, usually the pilot occupied seat, the catapult possessing a number of structural refinements and features making it possible to install the catapult in aircraft already fitted for other types of ejection equipment, for instance, in particular, the Martin-Baker ejection seat and Martin-Baker ejection catapult.

The catapult has an outer tube which is fixed with reference to the aircraft and which contains a cartridge assembly having a propellant charge in its lower end. The rocket motor assembly is located in the outer tube and contains rocket fuel, for instance rocket grain, that becomes exposed to the gases generated by the cartridge assembly propellant charge just as the rocket motor assembly is being propelled through the upper end of the outer tube. One of the features of the invention is a motor cup having a vent plug which separates from the motor cup prior to the instant that the rocket motor assembly leaves the outer tube. The motor cup is disposed in the outer tube and separates the cartridge propellant charge from the angulated nozzle end of the rocket motor assembly. Accordingly, the motor cup functions as a piston for displacing the rocket motor assembly in response to the generation of high pressure gases upon burning of the propellant charge of the cartridge assembly. However, the motor cup, in its upward travel, strikes an abutment in the outer tube causing it to separate from the rocket motor assembly and at the same time, causes the vent plug or plugs to be removed so that hot gases from the burning propellant charge may ignite the rocket grain.

There is a lock connected between the motor cup and the outer tube or a part connected to the outer tube. The lock is designed to release when a predetemined pressure level is achieved beneath the motor cup by the burning of the propellant charge in the cartridge assembly in order to make certain that the rocket motor assembly is initially propelled under sufficient thrust so that the entire catapult assembly will function with a proper alacrity.

Another object of the invention is to provide a new structural interconnection between the seat and the catapult wherein the seat has a plurality of slides guidingly retained in a pair of tracks that are constructed as a part of the outer tube which is fixed to the aircraft structure. The rocket motor assembly is structurally fastened to the seat and therefore, as soon as the rocket motor assembly begins to move, that is, when the aforementioned lock is released under the influence of gas pressure generated by the cartridge propellant charge, the seat is constrained in its travel, and so is the rocket motor assembly. This is of importance since the possibility of damage due to bending of the rocket tube, is obviated.

2

There is shown in the drawings a particular configuration of the ejection rocket catapult. Basic design requires that the initial propulsion of the rocket motor from the outer tube be initiated at the lower end of the rocket motor assembly. Therefore, the cartridge is located at the lower extremity of the rocket motor assembly and contained within the outer tube. At the same time, though, it is desirable to initiate the propellant charge of the cartridge assembly from a movement at the top of the ejection rocket catapult. For instance, an ideal manner of initiating ejection of the pilot occupied seat is to have the pilot pull his face curtain in front of his oxygen mask if one is being used or in front of his face in the absence of an oxygen mask. Accordingly, there are means, for instance a gas generator composed of an initiator cartridge assembly, physically connected to the upper end of the rocket motor assembly. Since the rocket motor assembly upper end is adjacent to the face curtain, the gas generator may be caused to operate by a lanyard attached to the face curtain or the face curtain attached structure and to the initiator cartridge assembly. High pressure hot gases are piped from the gas generator to the firing pin mechanism, including a percussion primer, of the previously described propellant charged cartridge. The gas conductor, being mechanically connected at one end to the gas generator which is rocket borne and physically connected to the firing mechanism of the propellant charge cartridge assembly in the inner tube, requires that the gas conductor pull apart when the rocket motor assembly begins to leave the outer tube. For this reason there is a quick-disconnect coupling in the gas conductor which separates in response to movement of the rocket motor assembly.

Other objects and features of importance will become evident in following the description of the illustrated form of the invention.

In the drawings:

FIGURE 1 is a side elevational view of a conventional aircraft seat which is provided with the ejection seat catapult, parts being broken away in vertical section to illustrate otherwise hidden detail.

FIGURE 2 is a vertical sectional view taken substantially on the plane indicated by the section line 2—2 of FIGURE 1.

FIGURE 5 is a transverse horizontal sectional view taken substantially on the plane indicated by the section line 5—5 of FIGURE 4.

Figure 3:
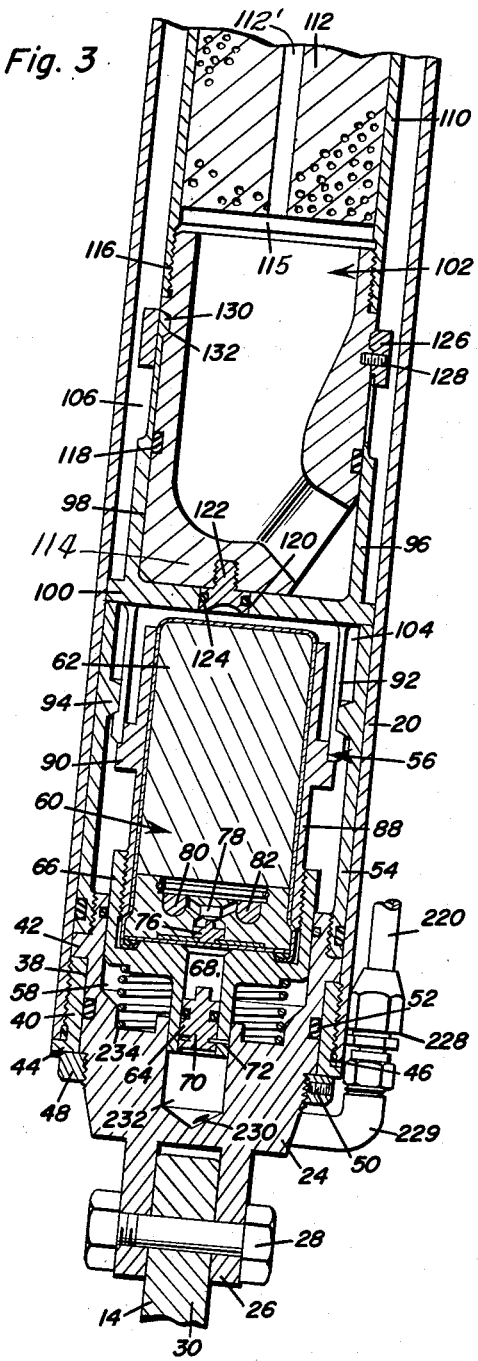
FIGURE 3 is a fragmentary enlarged sectional view of the catapult showing the lower end containing the cartridge propellant charge and showing the lower end of the rocket motor assembly contained within the catapult outer tube.

In the accompanying drawings several parts of a conventional aircraft are diagrammatically shown. The aircraft structure 10 beneath seat 12 is used to anchor a stationary bracket 14. The bulk head 16 is used to anchor the brackets 18, these being structures that are used to secure the outer tube 20 of the ejection seat catapult 22 to the aircraft structure. Tube 20 has a reaction block 24 rigidly secured to its lower end, see FIGURE 3, and provided with a pair of ears 26 through which pin 28 extends. This pin also extends through an ear 30 on brackets 14. The brackets 18 have a pair of aligned openings through which a pin 32 extends, this pin also passing through the bore 34 of a cap or lug 36 which is bolted or otherwise secured to the outer tube 20 (FIGURE 5) intermediate the upper and lower ends thereof.

Although various mechanical expedients may be resorted to in fastening reaction block 24 to the lower end of tube 20, FIGURE 3 shows a typical and satisfactory arrangement. The block 24 has a circumferential surface 38 on which the externally threaded nut 40 is disposed and which bears against the shoulder 42 of the block 24. A flange 44 of the nut 40 engages the lower extremity of tube 20, and the nut is threaded tightly in place. Seal 46 is interposed between a part of the nut 40 and the lower part of the tube 20. Retainer nut 48 is threaded on the block 24 and engages the flange 44, the retainer nut being held fixed by a pin or setscrew 50 which engages the block 24. Seals, such as seal 46 are used wherever it is found desirable and necessary. For instance there is an additional seal 52 between the nut 40 and a grooved part of the block 24.

The sleeve 54 which constitutes a part of the pressure opened lock or latch 56, fits flush against the inside surface of the lower part of tube 20 and is threadedly connected to the upper part of the reaction block 24. The latter has an upwardly opening recess 58 within which is accommodated the lower part of a cartridge assembly 60 containing a propellant charge 62. The cartridge assembly firing mechanism 64 consists of a cup 66 having a bore 68 within which a firing pin 70 is slidable. The firing pin is held in place by a shear pin 72 and is capable of being forcibly ejected against anvil 76 adjacent the percussion cap 78. The percussion cap is in registry with an igniter charge 80 which is disposed in a pocket 82 of the cartridge. Cup 66 has a locking sleeve 88 threaded in its upper open end and contains the propellant 62. The locking sleeve 88 has a tang lock retainer 90 on its outer surface constituting a seat for the tangs 92 of the latch or lock 56. An inwardly directed shoulder 94 which is made integral with the sleeve 54 also engages the tangs 92, seating against a surface of the enlargement on the outer end of each.

Tangs 92 are fixed to the motor cup 96 which is constructed of a cylindrical side wall 98 and a transverse partition wall 100 fixed to the cylindrical side wall. Tangs 92 are fixed to wall 100, and the motor cup functions as a piston to move the entire rocket motor assembly 102 upwardly and through the upper end of the tube 20. The wall 100 separates the chamber 104 from the chamber 106 in the outer tube 20, the chamber 104 containing the cartridge 60 and the chamber 106 containing the rocket motor assembly 102.

Rocket motor assembly 102 is constructed of a rocket tube 110 containing rocket fuel, for instance rocket grain 112, together with a nozzle block 114 which is threaded at 116, to the lower end of the rocket tube 110. The nozzle block fits snugly within the cylindrical wall 98 and has an annular groove accommodating seal 118 between the outer surface of the block 114 and the inner surface of the cylindrical wall 98 of the motor cup 96. The rocket grain 112 is retained in the tube 110 by a foraminous retainer 115 located above the nozzle block 114. As seen in FIGURE 3, the nozzle is directed at an angle to the longitudinal axis of the rocket tube 110 so that the discharge axis of the nozzle is in a direction to pass forwardly and upwardly through the approximate combined center of gravity of the seat 12 and the seat occupant. Notice that the thrust axis is forward with reference to the assumed direction of flight and upward, assuming a straight and level flight attitude, in order to attenuate the high deceleration forces that are generated as a result of dynamic pressure on the seat and the seat occupant when the seat is ejected into the air stream.

One or more vent openings 120 are in the wall 100 of the motor cup 96. A vent plug 122 is in each vent opening 120 and is arranged to withdraw from the opening 120 at the proper instant during the operation of the ejection seat catapult. Plug 122 is attached, for example by being threaded, to the lower part of nozzle block 114 and has a head 124 which occupies opening 122. A latch or lock release sleeve 126 is connected by shear pin 128 to the outer surface of nozzle block 114. The purpose of the latch release sleeve is to cause the motor cup 96 to be separated from the nozzle block 114 of the rocket motor assembly. The upper end of the side wall 98 is slotted, and has shallow enlargements 130 at the extreme upper end, which fit into the shallow circumferential groove 132 in the nozzle block 114. Release sleeve 126 retains the enlargement 130 in the shallow groove 132, but upon impact of the release sleeve 126 with an abutment 134 (FIGURE 4) the shear pin 128 fails enabling the sleeve 126 to slide down on the slotted end of the cylindrical wall 128 so that the enlargement 130 easily slides from the shallow groove 132.

Abutment 134 is constructed of a shoulder at the lower end of the rocket tube guide sleeve 136. This sleeve has threads 138 engaged with threads at the upper end of the tube 20 so that the sleeve 136 is fixed to sleeve 20. Rocket tube 110 of the rocket motor assembly extends completely through the bore of the sleeve 136 and contains a closure fitting 140 at its upper end. Gas generator 142 constructed of an initiator cartridge assembly 144, is carried by fitting 140. The initiator cartridge contains a ballistic combustible substance ignited by actuation of the percussion cap 146, the latter being struck by firing pin 148 or by an anvil interposed between the firing pin and the percussion cap. The initiator cartridge assembly functions as a gas generator to produce high temperature-high pressure gases in the chamber 150 enclosed by the walls of a cavity 152 in the fitting 140 and the upper surface of a divider 154 which is threaded or otherwise fastened in cavity 152. A number of radial ports 156 open into the chamber 150 and extend through the side wall of the fitting 140, these ports being registered with a manifold 158 having an annular passage 160. Manifold 158 has a pair of seals 159 in grooves on opposite sides of passage 160 which seals are in contact with the outer surface of the rocket tube 110. The upper end of the manifold 158 is internally threaded to engage the exterior threads of a collar 162 having internal threads 164 which engage threads on the outer upper surface of the rocket tube 110. One or more pins 166 lock the rocket tube 110 and the fitting 140 together. Secondary igniter material 161 is in a cavity in the divider 154 and is retained by a rupturable diaphragm, e.g. plastic, 163 at the upper end of the rocket grain 112. For example, an axially extending passage 112′ in the rocket grain 112 is in communication at its upper end with the diaphragm 163.

The rocket motor assembly is attached at its upper end to the seat 12. Seat bracket 170 is connected to the rear of the seat, and there is a rocket motor pad beneath the bracket 170 and fixed to the back surface of the seat. Collar 162 has an annular groove 172 in which a portion of the bracket 170 is nested. This assures a firm and substantial connection of the rocket motor assembly with the seat 12. Gas generator 142 has the initiator cartridge assembly 144 contained within a fitting 178 having a reduced lower end 180 threaded into a bore that opens into the chamber 150. The upper part of the fitting 178 is enlarged and has a circumferential recess 184 within which a part of the collar 162 seats. Barrel 186 is threaded into a bore in alignment with the bore of the fitting 140. Firing pin 148 is slidably disposed in the barrel 186 and is spring pressed toward the percussion cap 146. The spring 190 seats on a lateral shoulder 192 on the firing pin and seats on a shoulder 194 that projects inwardly of the bore of the barrel 186. The upper end of the firing pin is bifurcated and has an axle 198 extending across the bifurcated end. Roller 200 is mounted for rotation on the axle and seats on the cam surface 202 of the latch 204. The latch 204 bridges a part of the bore of barrel 186 and is located between the sides of the bifurcated end of the firing pin. By seating on the upper end of the barrel 186, the latch 204 holds the firing pin retracted against the yielding opposition of spring 190. The spring 190 is capable of storing a considerable amount of potential energy which becomes dissipated as kinetic energy upon withdrawal of the latch 204.

Figure 4:
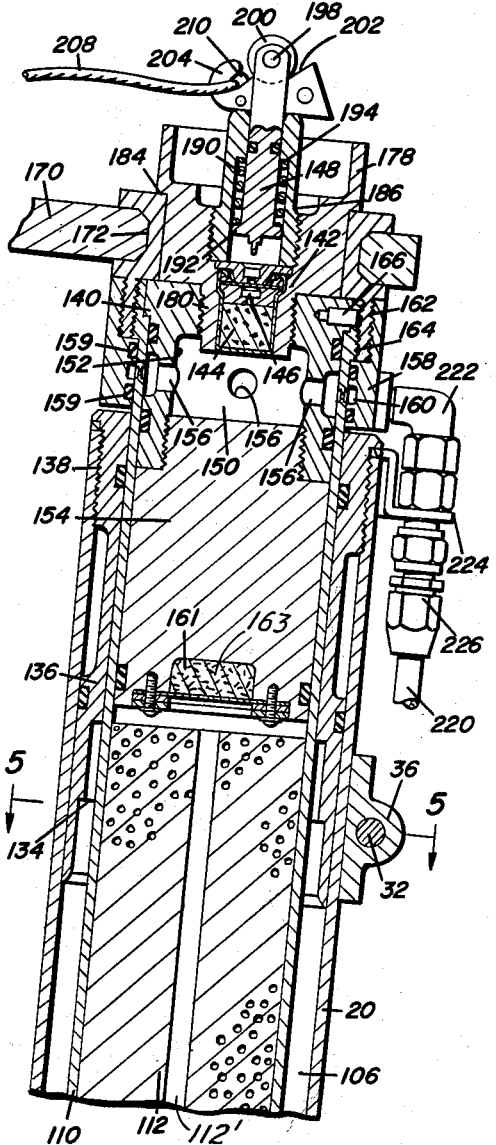
FIGURE 4 is an enlarged sectional view of the upper end of the catapult showing the initiator cartridge gas generator together with the upper end of the rocket motor assembly.

The latch 204 may be withdrawn in a number of ways. FIGURE 4 shows a lanyard 208 connected with a latch 204 by an enlargement and slot connection 210. If the lanyard is secured to the face curtain of the pilot, as soon as the pilot pulls the face curtain from normal position, the lanyard 208 is pulled thereby withdrawing the latch 204 from the bifurcated end of the firing pin 148. The cam surface 202 causes the firing pin to be lifted against the yielding opposition of the spring 190 until a considerable amount of potential energy is stored in the spring. As soon as the roller rides over the apex of the cam surface 202, the firing pin 148 is spring projected in a direction to cause the percussion cap 146 to fire. As a consequence the gas generator 142 begins to function thereby generating gases in the chamber 152 under high pressure and at a practically instantaneous rate. This gas is conducted through the ports 156, manifold 160 and gas conductor 220. The gas conductor is secured by a conventional tubing fitting 222 to the manifold 158 and is held supported by the bracket 224 which is conveniently attached, for instance to the tube 20. A quick disconnect coupling 226 which pulls apart in response to a tensile stress, is interposed in the gas conductor 220. The quick disconnect coupling 226 may be anywhere along the length of the gas conductor 220. Further, an additional coupling 228 identical to the coupling 226 may be provided in the conductor 220 should more than one coupling be desired to assure that the gas conductor 220 will separate at the proper time during the operation of the ejection seat catapult. The lower end of the gas conductor 220 has a fitting 229 connecting the gas conductor to a passageway 230 in the reaction block 24. The passageway opens into the gas chamber 232 in the reaction block 24. The gas chamber has a cylindrical side wall accommodating the reduced diameter lower end of the cup 66. Firing pin 70 is exposed to the gases under pressure in the chamber 232 to cause the firing pin to move after the shear pin 72 fails that is, when a sufficient pressure is developed in the chamber 232. Spring 234 is seated on the reaction block 24 and has a part of the cup 66 disposed on it thereby resiliently mounting the propellant charge containing cartridge 60 within the lower extremity of the outer tube 20.

The physical connection between the ejection seat catapult, the seat 12 and the aircraft structure is important. Outer tube 20 is secured to the brackets 18 and the bulkhead 14 so that the outer tube is fixed with reference to the aircraft. The seat is connected with the aircraft structure by a frangible link 240 by seating in an upwardly opening nest 242 or is connected by some other easily separable structure to the aircraft. The rocket motor assembly is releasably fastened by the latch 56 to the outer tube 20 and is connected by the bracket 170 to the seat 12. A pair of outwardly opening rails 244 and 246 (FIGURE 5) are fixed to the outer tube 20. These rails may be made directly in the material of the outer tube 20 and if necessary, steel liners 248 and 250 may be fixed within the outer tube 20. A number of vertically spaced slides 254 and 256 are held captive in the rails 244 and 246 respectively, and the slides are secured to the pair of parallel seat supported flanges 258 and 260 which are rigidly secured to the back of the seat 12. By having slides 254 and 256 vertically spaced along the length of the flanges 258 and 260, the seat 12 and the rocket motor assembly are constrained in their travel as they move upwardly during ejection.

*Operation*

The first step in ejecting the seat 12 together with the seat occupant, is to actuate the gas generator 142. Although this may be achieved in a number of ways, one configuration of the ejection seat catapult employs the lanyard 208 which is ultimately connected with the pilot face curtain. When the lanyard 208 is pulled, the firing pin 148 is lifted against the yielding opposition of the spring 190. Upon withdrawal of the latch 204 the spring 190 forcibly moves the firing pin 148 to a position at which the percussion cap 146 is actuated thereby causing the initiator cartridge to burn. Gas under pressure is produced in the chamber 150, and this gas is conducted through the manifold 158, the piping which includes gas conductor 220 and the quick disconnect couplings.

The gas passing through the conductor 220 enters the chamber 232, building up a pressure sufficient to shear the pin 72. When this happens the pin 70 strikes the anvil 76, and the anvil engages the percussion cap 78 causing the ejection cartridge 60 to be initiated. When the propellant 62 burns, gas under pressure is generated, filling the chamber 104 (FIGURE 3) and building up a pressure beneath the wall 100 of the motor cup 96. When this pressure obtains a predetermined pressure level the tank lock or latch 56 is released and the rocket motor assembly together with the motor cup 96 begins to move upwardly in the comparatively fixed outer tube 20.

Since the rocket motor assembly is attached at its upper end to the seat 12, the seat begins to move upwardly by the action only of the gas generated in chamber 104. Therefore, the initial movement of the seat is caused by actuation of the ballistic propellant charge in the cartridge assembly 60. Further, as the seat and the rocket motor assembly are moved upwarly the motion of each is constrained by the slides 254 and 256 in the rails 244 and 246, preventing the rocket motor tube 110 from bending and assuring that upon separation of the rocket motor, the rocket tube is oriented correctly with reference to the seat 12 in order to take advantage of the directional nozzle thrust axis, an extension of which passes through the combined center of gravity of the seat and its occupant.

As the rocket motor assembly begins to leave the tube 20, the release sleeve 126 contacts abutment 134 thereby separating the release sleeve 126 from the motor cup and enabling the motor cup to separate from the nozzle block 114. Plug 122 is separated from the vent opening 120 since the plug is attached to the nozzle block 114 and this opens a passageway between the chambers 104 and 106. Hot gases under pressure developed by the cartridge assembly 60 pass through the opening 120 and engage the fuel of the rocket motor, igniting it just prior to complete physical separation of the rocket motor and the tube 20.

Secondary igniter 161 assures reliable ignition of the rocket engine at cold temperatures. The propellant gas from the cartridge 62 will rupture the plastic diaphragm 163 and will simultaneously ignite the igniter material of the secondary igniter. The secondary igniter will then ignite the rocket propellant 112. For example, the explosive gases from the cartridge 62 pass upwardly through the axial passage 112, whereby the diaphragm 163 is ruptured and the secondary igniter 161 ignited. At high and ambient temperatures the secondary igniter 161 is not required, and may actually be ignited by the rocket propellant rather than functioning as an igniter material. However, it is required for cold temperature operation and prevents any ignition delay or misfire of the rocket engine.

When the rocket motor is operative, the seat 12 is further propelled by rocket thrust which is applied in the direction through the combined center of gravity of the seat and occupant, upwardly and forwardly with respect to assumed straight and level flight.

Figure 6:
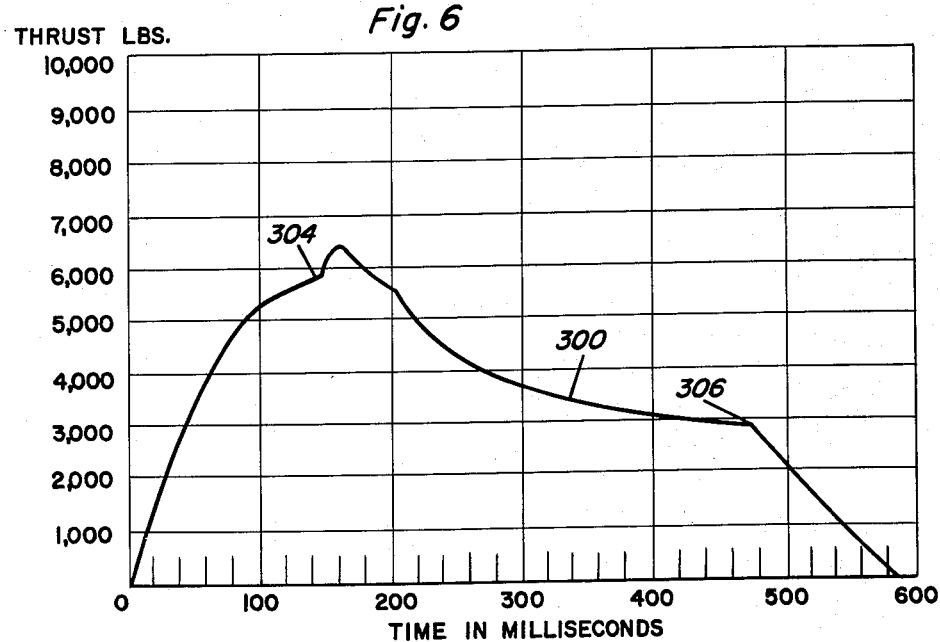
FIGURE 6 is a graph showing a performance curve wherein thrust is plotted against time.
Figure 7:
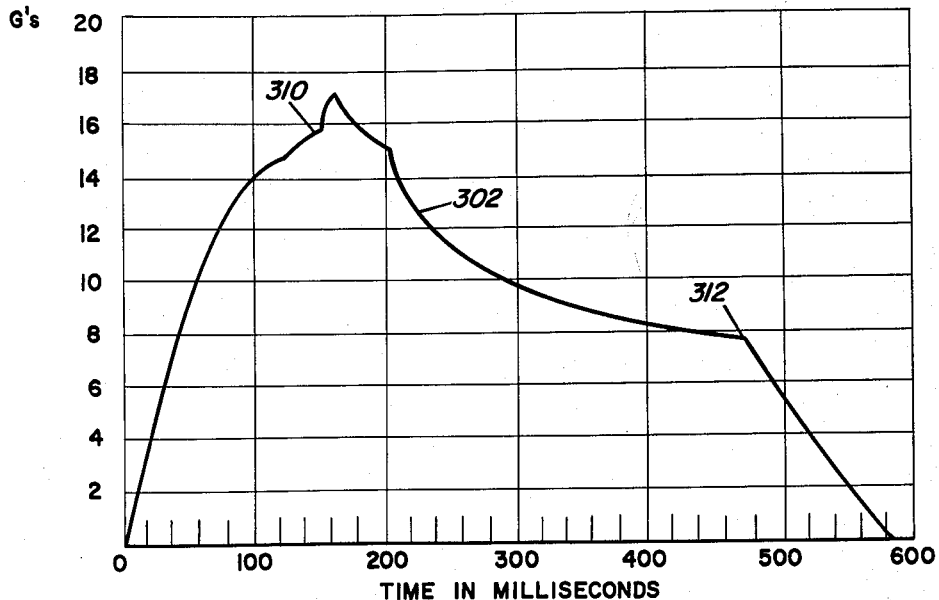
FIGURE 7 is another graph showing a curve of acceleration against time.

Performance curves 300 and 302 in FIGURES 6 and 7 show thrust results as follows: The abscissa for each graph is graduated in milliseconds, while the ordinate in FIGURE 6 is graduated in pounds of thrust, and the ordinate in FIGURE 7 is graduated in G terms of acceleration. The ejected mass i.e. seat and occupant, is 375 lbs. The rocket motor nozzle has its thrust axis at an angle of 50° to the X axis and 40° to the Y axis where the X axis is defined as parallel to the longitudinal axis of the rocket motor. The thrust developed is seen to be steep, that is rapid, depicted by a steep curve for approximately the first 100 milliseconds. At the point 304 on curve 300 the rocket motor is separated from the stationary tube 20, quickly causing about 500 lbs. of thrust to be developed over a brief period of approximately 50 milliseconds. After peaking, curve 300 has a negative slope. Point 306 on curve 300 is a the rocket web burn-out.

Curve 302 shows acceleration vs. time with the point 310 responding to point 304 in that there was rocket-catapult separation. The criteria for the curve in FIGURE 7 is the same as that described in connection with curve 300. The point 312 on curve 302 is at rocket web burn-out.

Although high thrust and high acceleration is achieved in this ejection seat catapult, the curves show that the forces to which the human being in seat 12 is subjected are with a parameter of human tolerance.

It is understood that various changes may be made in the ejection seat catapult without departing from the protection of the following claim.

What is claimed as new is as follows:

A catapult for an aircraft seat, said catapult comprising an outer tube, means at one end of said tube to fasten said tube to the aircraft, a rocket motor assembly in said outer tube and including a downwardly facing discharge nozzle arranged at an angle to the longitudinal axis of said rocket motor assembly, a rocket motor cup slidable in said tube and separably connected with the nozzle end of said rocket motor assembly, a propellant charge in said outer tube below said cup, means for initiating the burning of said charge to drive said assembly and said cup outwardly of said tube, means for releasing said motor cup from said rocket assembly as said assembly is propelled outwardly of said tube by the gas generated by said charge, said rocket motor assembly containing rocket fuel exposed to said gas when said cup is separated from said rocket assembly thereby igniting the rocket fuel just prior to separation of the rocket assembly from said outer tube, said means for initiating the burning of said charge including a gas generator integrally carried by the upper end of said rocket motor assembly opposite said nozzle, said gas generator comprising a firing pin mounted adjacent a percussion cap, resilient means urging the firing pin toward said percussion cap, a latch member interposed between said pin and said cap thereby holding the firing pin retracted against the yielding opposition of said resilient means, and an elongated flexible element secured to said latch and arranged to be longitudinally pulled by the occupant of said seat while said occupant is positioned for ejection as to remove the latch from between the firing pin and the percussion cap thereby releasing the firing pin for detonating said cap and initiating the generating of gas by said gas generator; means defining a chamber positioned immediately subjacent said gas generator and arranged to contain the gas issuing therefrom, a manifold circumferentially engaging said chamber means, means defining a plurality of ports communicating said chamber with the manifold; and a gas conductor line extending between said manifold and said propellant charge as to communicate gases from said chamber through said gas line to the propellant charge to initiate the latter, said gas conductor line including a first fitting securing one end of the gas line to said manifold, a second fitting securing the other end of the gas line adjacent the propellant charge; and a quick disconnect coupling interposed in said gas conductor line intermediate the ends thereof arranged to pull apart in response to a tensile stress in said line whereby upon initiating of said propellant charge the portion of said line extending between said coupling and said second fitting remains with said aircraft and the portion of said line extending between said coupling and said first fitting moves outwardly of said aircraft with said seat and said rocket motor assembly.

References Cited in the file of this patent

UNITED STATES PATENTS

| Re. 23,981 | Stanley | Apr. 12, 1955 |
| 2,467,763 | Martin | Apr. 19, 1949 |
| 2,703,960 | Prentiss | Mar. 15, 1955 |
| 2,773,448 | Jasse | Dec. 11, 1956 |
| 2,791,962 | Terce | May 14, 1957 |
| 2,808,217 | Martin | Oct. 1, 1957 |
| 2,900,150 | Hirt et al. | Aug. 18, 1959 |
| 2,937,830 | Fulton | May 24, 1960 |

FOREIGN PATENTS

| 1,029,282 | France | Mar. 4, 1953 |

OTHER REFERENCES

Aviation Week Magazine, Nov. 12, 1956, vol. 65, No. 20, pages 71, 72, 74, 77.